US012539845B2

(12) United States Patent
Pfau

(10) Patent No.: US 12,539,845 B2
(45) Date of Patent: Feb. 3, 2026

(54) CONTROLLER FOR STRADDLE-TYPE VEHICLE, RIDER-ASSISTANCE SYSTEM, AND CONTROL METHOD FOR STRADDLE-TYPE VEHICLE

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 18/013,008

(22) PCT Filed: Jun. 11, 2021

(86) PCT No.: PCT/IB2021/055152
§ 371 (c)(1),
(2) Date: Dec. 27, 2022

(87) PCT Pub. No.: WO2021/260479
PCT Pub. Date: Dec. 30, 2021

(65) Prior Publication Data
US 2023/0242100 A1 Aug. 3, 2023

(30) Foreign Application Priority Data
Jun. 26, 2020 (JP) .................................. 2020-110090

(51) Int. Cl.
*B60W 30/085* (2012.01)
*B60W 30/16* (2020.01)

(52) U.S. Cl.
CPC .......... *B60W 30/085* (2013.01); *B60W 30/16* (2013.01); *B60W 2300/36* (2013.01);
(Continued)

(58) Field of Classification Search
CPC ............... B60W 30/085; B60W 30/16; B60W 2300/36; B60W 2554/4041; B60W 2554/4049
See application file for complete search history.

(56) References Cited

U.S. PATENT DOCUMENTS 11,524,680 B2 * 12/2022 Pfau ...................... B60W 30/16
2015/0077236 A1 * 3/2015 Le Masurier .......... G08G 1/163
340/435

(Continued)

FOREIGN PATENT DOCUMENTS

DE 102013218458 A1 * 3/2015 ............... G08G 1/16
JP 2009116882 A 5/2009
(Continued)

OTHER PUBLICATIONS

DE102013218458 Translation and Original ; 2013 (Year: 2013).*
International Search Report and Written Opinion for Application No. PCT/IB2021/055152 dated Sep. 10, 2021 (9 pages).

*Primary Examiner* — Rachid Bendidi
*Assistant Examiner* — Nada Mahyooob Alqaderi
(74) *Attorney, Agent, or Firm* — Michael Best & Friedrich LLP

(57) ABSTRACT

The present invention provides a controller capable of handling special travel made by a straddle-type vehicle. The present invention also obtains a rider-assistance system including such a controller. The present invention further obtains a control method capable of handling special travel made by a straddle-type vehicle.
Left target information and right target information are acquired on the basis of output of at least one surrounding environment detector (11*c*, 11*d*). The left target information is information on a target (T1) located on a left side of a travel line (DL) of a straddle-type vehicle (100). The right target information is information on a target (T2) located on a right side of the travel line (DL). A travel state of the straddle-type vehicle (100) is analyzed on the basis of at least one of the left target information and the right target information, and rider-assistance operation corresponding to an analysis result thereof is executed.

15 Claims, 4 Drawing Sheets

(52) U.S. Cl.
CPC ............... *B60W 2554/4041* (2020.02); *B60W 2554/4049* (2020.02)

(56) References Cited

U.S. PATENT DOCUMENTS

| | | | | |
|---|---|---|---|---|
| 2017/0213149 A1* | 7/2017 | Micks | ................... | G06N 3/088 |
| 2019/0248367 A1* | 8/2019 | Knitt | ................... | B60W 10/184 |
| 2019/0329778 A1* | 10/2019 | D'sa | ..................... | G06V 20/56 |
| 2020/0384994 A1* | 12/2020 | Pfau | ..................... | B60W 30/14 |
| 2022/0144273 A1* | 5/2022 | Yamaguchi | ..... | B60W 60/00276 |

FOREIGN PATENT DOCUMENTS

| | | | | |
|---|---|---|---|---|
| JP | 2016034819 A | | 3/2016 | |
| JP | 2019099033 A | * | 6/2019 | ............ G08G 1/166 |
| WO | 2017115371 A1 | | 7/2017 | |
| WO | WO-2019111139 A1 | * | 6/2019 | ............ B60W 30/16 |
| WO | WO-2020041188 A1 | * | 2/2020 | ............ B62K 11/04 |

* cited by examiner

[FIG. 1]
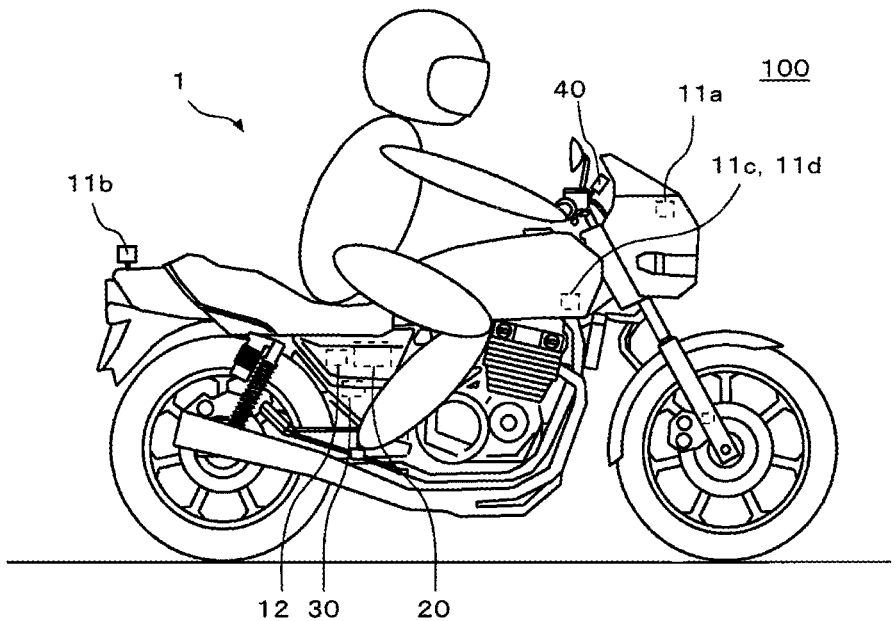
[FIG. 2]
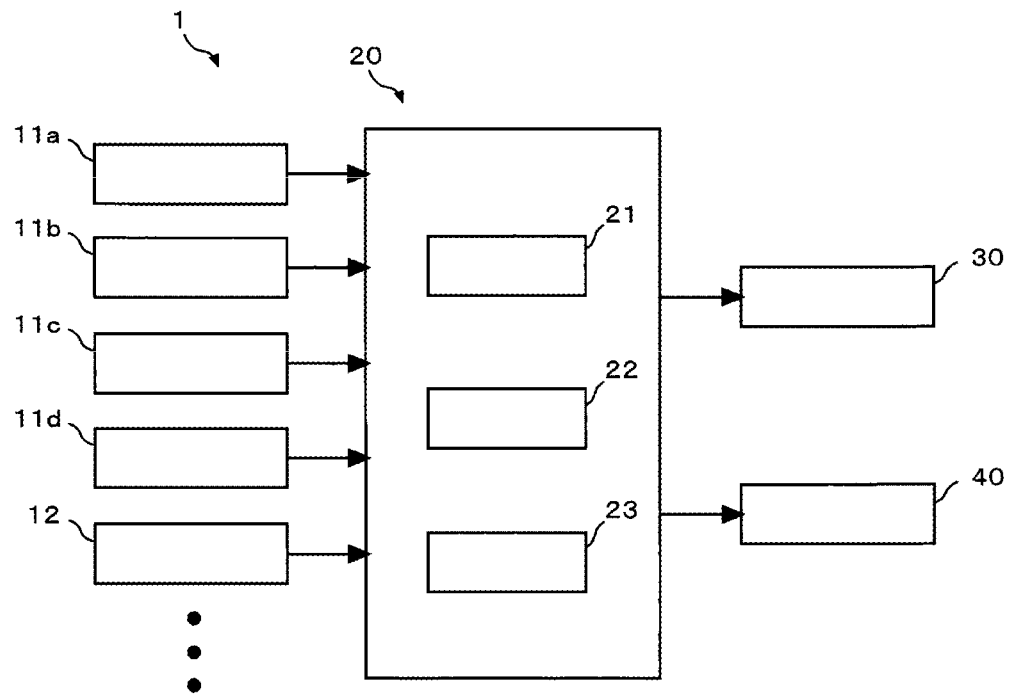

[FIG. 3]
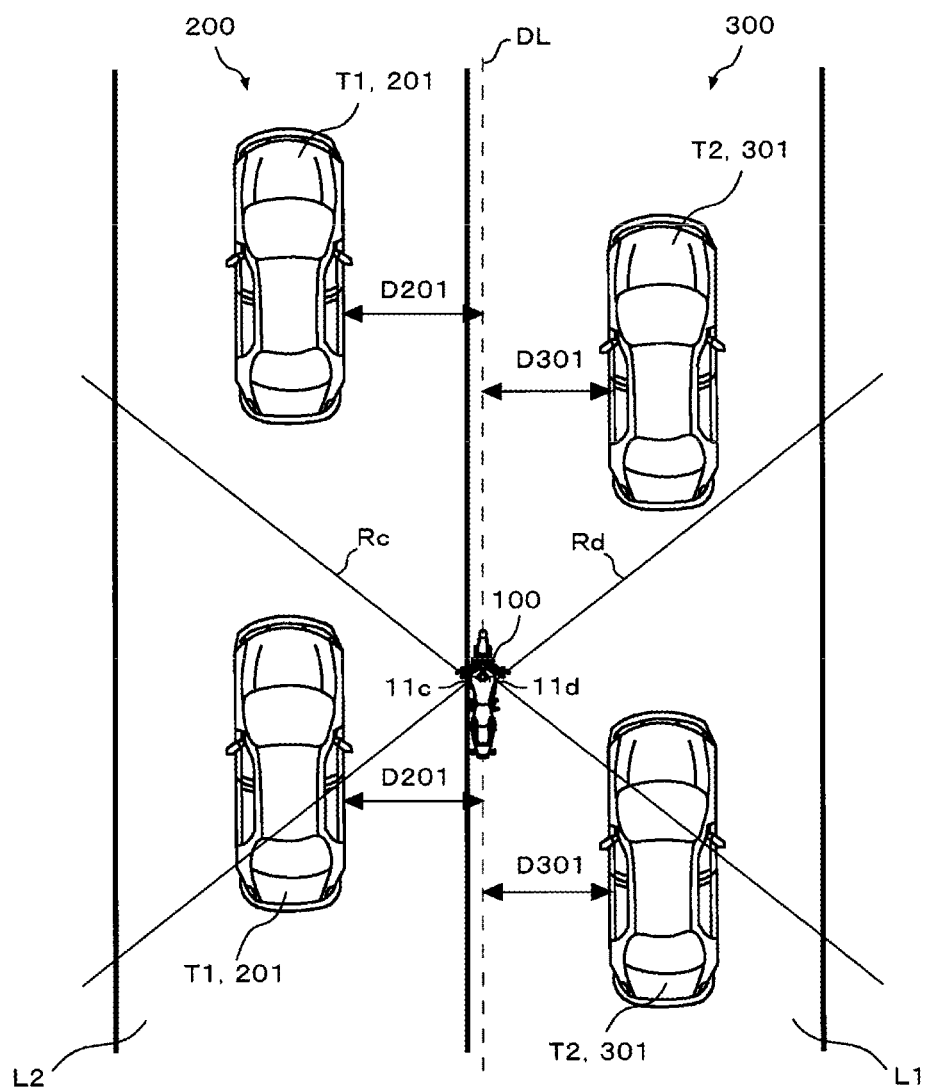

[FIG. 4]
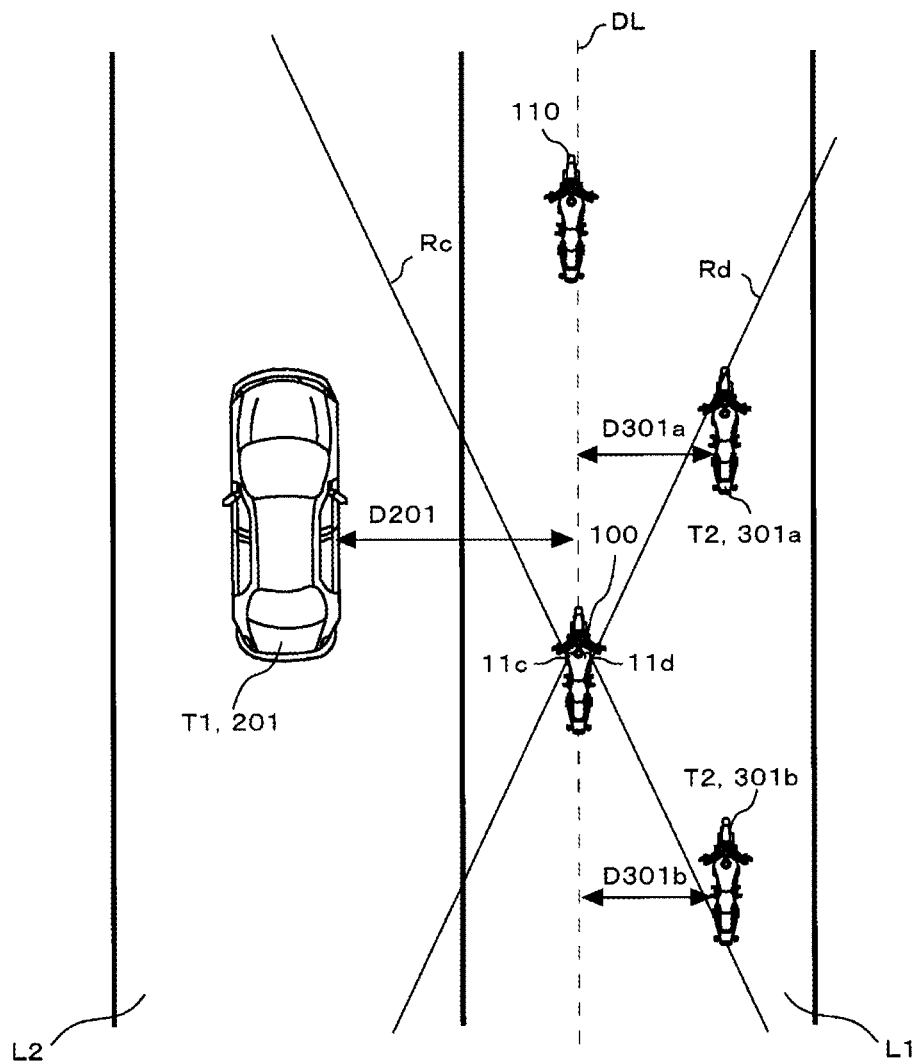

[FIG. 5]
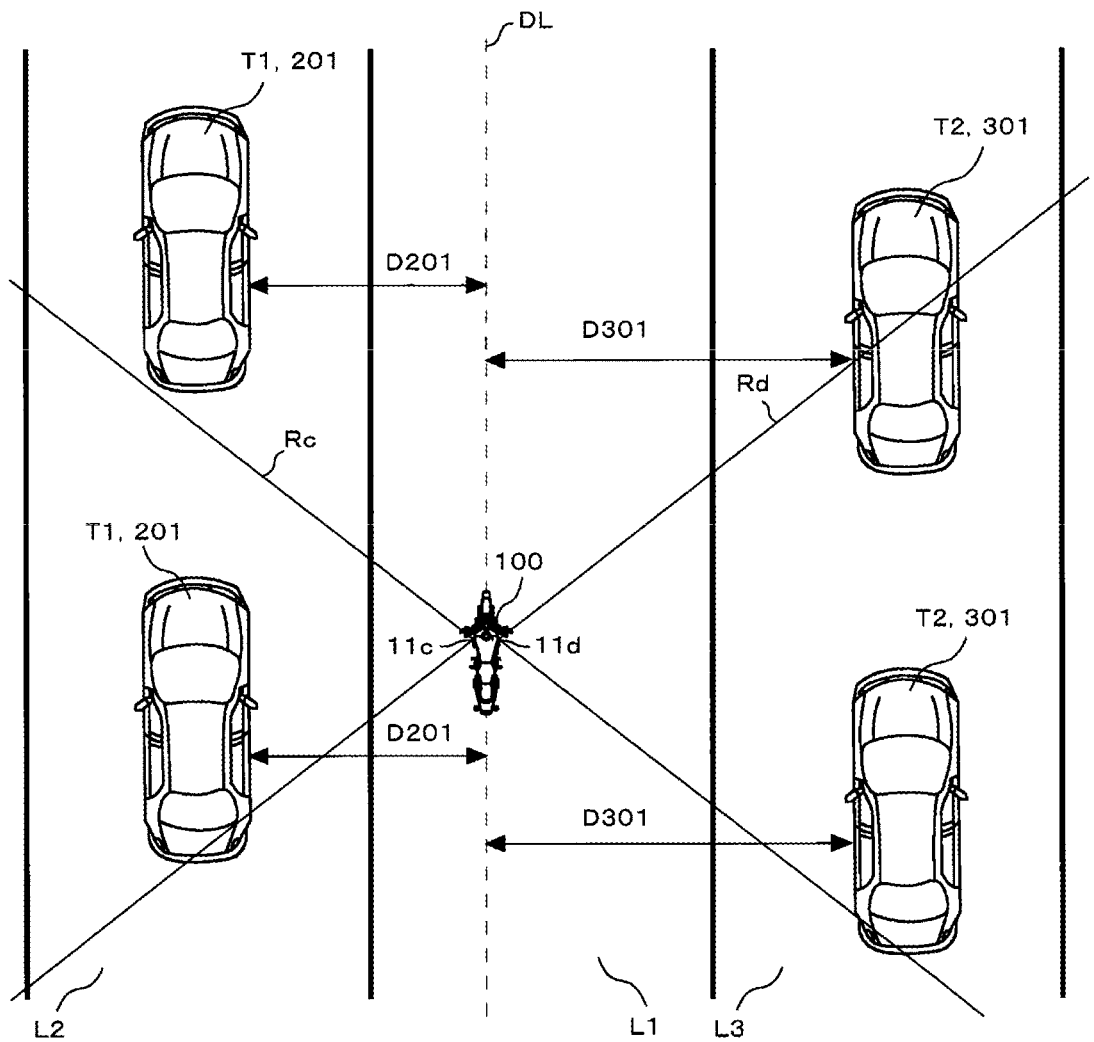
[FIG. 6]
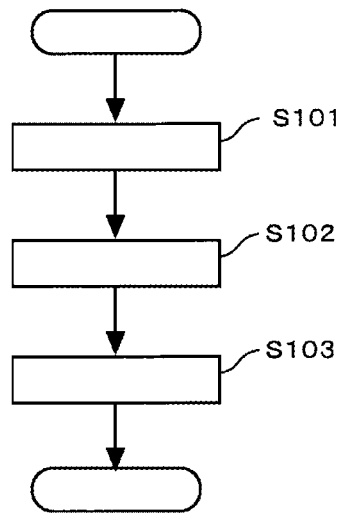

CONTROLLER FOR STRADDLE-TYPE VEHICLE, RIDER-ASSISTANCE SYSTEM, AND CONTROL METHOD FOR STRADDLE-TYPE VEHICLE

BACKGROUND OF THE INVENTION

The present invention relates to a controller for a straddle-type vehicle, to which at least one surrounding environment detector is mounted, a rider-assistance system including such a controller, and a control method for a straddle-type vehicle, to which at least one surrounding environment detector is mounted.

As a conventional straddle-type vehicle, a straddle-type vehicle, to which a surrounding environment detector is mounted, is available. Information on a target that is located in front of the straddle-type vehicle on a travel line thereof is acquired on the basis of output of the surrounding environment detector (for example, see JP-A-2009-116882).

SUMMARY OF THE INVENTION

The straddle-type vehicle is much smaller than other vehicles (for example, a passenger car, a truck, and the like). For this reason, the straddle-type vehicle can make special travel that is not assumed by the other vehicles. On the other hand, in the conventional straddle-type vehicle, the information on the target that is located in front of the straddle-type vehicle on the travel line thereof is acquired on the basis of the output of the surrounding environment detector. There is a possibility that the special travel made by the straddle-type vehicle cannot appropriately be handled with such information.

The present invention has been made with the above-described problem as the background and therefore obtains a controller capable of handling special travel made by a straddle-type vehicle. The present invention also obtains a rider-assistance system including such a controller. The present invention further obtains a control method capable of handling special travel made by a straddle-type vehicle.

Solution to Problem

A controller according to the present invention is a controller for a straddle-type vehicle, to which at least one surrounding environment detector is mounted, includes: an execution section that executes rider-assistance operation to assist with a rider of the straddle-type vehicle, and further includes: an acquisition section that acquires left target information and right target information on the basis of output of the surrounding environment detector, the left target information being information on a target that is located on a left side of a travel line of the straddle-type vehicle and the right target information being information on a target that is located on a right side of the travel line; and an analysis section that analyzes a travel state of the straddle-type vehicle on the basis of at least one of the left target information and the right target information that are acquired by the acquisition section. The execution section executes the rider-assistance operation that corresponds to an analysis result of the travel state by the analysis section.

A rider-assistance system according to the present invention includes the above-described controller.

A control method according to the present invention is a control method for a straddle-type vehicle, to which at least one surrounding environment detector is mounted, includes an execution step in which an execution section of a controller executes rider-assistance operation to assist with a rider of the straddle-type vehicle, and further includes: an acquisition step in which an acquisition section of the controller acquires left target information and right target information on the basis of output of the surrounding environment detector, the left target information being information on a target that is located on a left side of a travel line of the straddle-type vehicle and the right target information being information on a target that is located on a right side of the travel line; and an analysis step in which an analysis section of the controller analyzes a travel state of the straddle-type vehicle on the basis of at least one of the left target information and the right target information that are acquired in the acquisition step. In the execution step, the execution section executes the rider-assistance operation that corresponds to an analysis result of the travel state in the analysis step.

Advantageous Effects of Invention

In the controller, the rider-assistance system, and the control method according to the present invention, the left target information, which is the information on the target located on the left side of the travel line of the straddle-type vehicle, and the right target information, which is the information on the target located on the right side of the travel line, are acquired on the basis of the output of the at least one surrounding environment detector, the travel state of the straddle-type vehicle is analyzed on the basis of at least one of the left target information and the right target information, and the rider-assistance operation corresponding to the analysis result is executed. Therefore, it is possible to appropriately handle special travel made by the straddle-type vehicle.

BRIEF DESCRIPTION OF THE DRAWINGS

FIG. 1 is a view illustrating a mounted state of a rider-assistance system according to an embodiment of the present invention to a straddle-type vehicle.

FIG. 2 is a diagram illustrating a system configuration of the rider-assistance system according to the embodiment of the present invention.

FIG. 3 is a view illustrating a detection state of a surrounding environment detector in the rider-assistance system according to the embodiment of the present invention in a situation where the straddle-type vehicle travels between rows of vehicles.

FIG. 4 is a view illustrating the detection state of the surrounding environment detector in the rider-assistance system according to the embodiment of the present invention in a situation where the straddle-type vehicle travels in a group.

FIG. 5 is a view illustrating the detection state of the surrounding environment detector in the rider-assistance system according to the embodiment of the present invention in a situation where the straddle-type vehicle travels on one side in a lane.

FIG. 6 is a chart illustrating an operation flow of a controller in the rider-assistance system according to the embodiment of the present invention.

DETAILED DESCRIPTION

A description will hereinafter be made on a controller, a rider-assistance system, and a control method according to the present invention with reference to the drawings.

Each of a configuration, operation, and the like, which will be described below, is merely one example, and the controller, the rider-assistance system, and the control method according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a straddle-type vehicle other than the two-wheeled motor vehicle. Examples of the straddle-type vehicle are motorcycles (the two-wheeled motor vehicle and a three-wheeled motor vehicle), an all-terrain vehicle, and a pedal-driven vehicle. The motorcycles include: a vehicle that has an engine as a propelling source; a vehicle that has an electric motor as the propelling source; and the like, and examples of the motorcycle are a bike, a scooter, and an electric scooter. The pedal-driven vehicle means a vehicle in general that can travel forward on a road by a depression force applied to pedals by a rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar portions will be denoted by the same reference sign or will not be denoted by a reference sign. In addition, a detailed structure will appropriately be illustrated in a simplified manner or will not be illustrated.

Embodiment

A description will hereinafter be made on a rider-assistance system according to an embodiment.

<Configuration of Rider-Assistance System>

A description will be made on a configuration of the rider-assistance system according to the embodiment.

FIG. 1 is a view illustrating a mounted state of the rider-assistance system according to the embodiment of the present invention to a straddle-type vehicle. FIG. 2 is a diagram illustrating a system configuration of the rider-assistance system according to the embodiment of the present invention. FIG. 3 is a view illustrating a detection state of a surrounding environment detector in the rider-assistance system according to the embodiment of the present invention in a situation where the straddle-type vehicle travels between rows of vehicles. FIG. 4 is a view illustrating the detection state of the surrounding environment detector in the rider-assistance system according to the embodiment of the present invention in a situation where the straddle-type vehicle travels in a group. FIG. 5 is a view illustrating the detection state of the surrounding environment detector in the rider-assistance system according to the embodiment of the present invention in a situation where the straddle-type vehicle travels on one side in a lane.

As illustrated in FIG. 1 to FIG. 5, a rider-assistance system 1 is mounted to a straddle-type vehicle 100. The rider-assistance system 1 includes: a surrounding environment detector 11a that outputs surrounding environment information on environment in front of the straddle-type vehicle 100; a surrounding environment detector 11b that outputs surrounding environment information on environment behind the straddle-type vehicle 100; a surrounding environment detector 11c that outputs surrounding environment information on environment on a left side of the straddle-type vehicle 100; a surrounding environment detector 11d that outputs surrounding environment information on environment on a right side of the straddle-type vehicle 100; a travel state detector 12 that outputs travel state information on the straddle-type vehicle 100; and a controller (ECU) 20.

The rider-assistance system 1 executes rider-assistance operation to assist with a rider of the straddle-type vehicle 100 by using the surrounding environment information that is output from the surrounding environment detectors 11a, 11b, 11c, 11d when necessary. The controller 20 receives detection results by various detectors (not illustrated) that output other types of information (for example, information on a brake operation state by the rider, information on an accelerator operation state by the rider, and the like) when necessary. Each of the devices in the rider-assistance system 1 may exclusively be used for the rider-assistance system 1, or may be shared with another system.

Each of the surrounding environment detectors 11a, 11b, 11c, 11d is a radar, a Lidar sensor, an ultrasonic sensor, a camera, or the like, for example. The surrounding environment detector 11a is provided to a front portion of the straddle-type vehicle 100 and faces a front side on a travel line DL of the straddle-type vehicle 100. The surrounding environment detector 11b is provided to a rear portion of the straddle-type vehicle 100 and faces a rear side on the travel line DL of the straddle-type vehicle 100. The surrounding environment detector 11c is provided to a lateral portion of the straddle-type vehicle 100 and faces a left side of the travel line DL of the straddle-type vehicle 100. The surrounding environment detector 11d is provided to a lateral portion of the straddle-type vehicle 100 and faces a right side of the travel line DL of the straddle-type vehicle 100. The single surrounding environment detector 11c may be provided. Alternatively, both of the surrounding environment detector 11c that has a detection range Rc on a diagonal front side of the straddle-type vehicle 100 and the other surrounding environment detector 11c that has the detection range Rc on a diagonal rear side of the straddle-type vehicle 100 may be provided. The single surrounding environment detector 11d may be provided. Alternatively, both of the surrounding environment detector 11d that has a detection range Rd on a diagonal front side of the straddle-type vehicle 100 and the other surrounding environment detector 11d that has the detection range Rd on a diagonal rear side of the straddle-type vehicle 100 may be provided. In addition, at least a part of each of the surrounding environment detector 11c and the surrounding environment detector 11d may be substituted by the surrounding environment detector 11a or the surrounding environment detector 11b. Here, the travel line DL is a swept path of the straddle-type vehicle 100 in the past or the future.

The travel state detector 12 includes a vehicle speed sensor and an inertia sensor (IMU). The vehicle speed sensor detects a vehicle speed generated on the straddle-type vehicle 100. The inertia sensor detects three-axis acceleration and three-axis (roll, pitch, and yaw) angular velocities generated on the straddle-type vehicle 100. The travel state detector 12 may detect other physical quantities that can substantially be converted to the vehicle speed generated on the straddle-type vehicle 100, the three-axis acceleration generated on the straddle-type vehicle 100, and the three-axis angular velocities generated on the straddle-type vehicle 100. In addition, the inertia sensor may partially detect the three-axis acceleration and the three-axis angular velocities. Furthermore, when necessary, at least one of the vehicle speed sensor and the inertia sensor may not be provided, or another sensor may be added.

The controller 20 at least includes an acquisition section 21, an analysis section 22, and an execution section 23. The sections of the controller 20 may collectively be provided in a single casing or may separately be provided in multiple casings. In addition, the controller 20 may partially or entirely be constructed of a microcomputer, a microprocessor unit, or the like, may be constructed of a member in which firmware or the like can be updated, or may be a program module or the like that is executed by a command from a CPU or the like, for example.

The acquisition section 21 acquires information on a target that is located around the straddle-type vehicle 100 on the basis of the output of the surrounding environment detectors 11a, 11b, 11c, 11d. In particular, the acquisition section 21 acquires left target information and right target information. The left target information is information on a target T1 that is located on a left side of the travel line DL of the straddle-type vehicle 100, and the right target information is information on a target T2 that is located on a right side of the travel line DL thereof. The analysis section 22 analyzes a travel state of the straddle-type vehicle 100 on the basis of at least one of the left target information and the right target information. The execution section 23 executes the rider-assistance operation that corresponds to an analysis result of the travel state by the analysis section 22.

As an example, as illustrated in FIG. 3, in a situation where the straddle-type vehicle 100 travels between rows of vehicles, that is, travels between a left row of vehicles 200 and a right row of vehicles 300, the acquisition section 21 acquires the left target information and the right target information on the basis of the output of the surrounding environment detectors 11c, 11d. The left target information is the information on the target T1 that is located on the left side of the travel line DL of the straddle-type vehicle 100, and the right target information is the information on the target T2 that is located on the right side of the travel line DL of the straddle-type vehicle 100. As the left target information, information on a relative distance D201 of a vehicle 201, which travels on the left side of the straddle-type vehicle 100, to the straddle-type vehicle 100 is acquired. As the right target information, information on a relative distance D301 of a vehicle 301, which travels on the right side of the straddle-type vehicle 100, to the straddle-type vehicle 100 is acquired. As the information on the relative distances D201, D301, the acquisition section 21 may acquire distances in a vehicle width direction of the straddle-type vehicle 100, may acquire distances at specified angles with respect to the vehicle width direction thereof, may acquire distances from a center of the straddle-type vehicle 100 in the vehicle width direction, may acquire distances from lateral surfaces of the straddle-type vehicle 100, may acquire distances to lateral surfaces of the vehicles 201, 301, may acquire distances to centers of the vehicles 201, 301 in vehicle width directions thereof, or may acquire other physical quantities that can substantially be converted to those. In the travel between the rows of the vehicles, the straddle-type vehicle 100 may travel at the different speed from the vehicle 201 or the vehicle 301, or may travel at the same speed. In the case where the straddle-type vehicle 100 travels between the rows of vehicles at the different speed from the vehicle 201 and the vehicle 301 (for example, when slipping by between the left row of vehicles 200 and the right row of vehicles 300, or the like), the acquisition section 21 acquires the information on the relative distances D201, D301 of the vehicles 201, 301 to the straddle-type vehicle 100 and thereafter acquires information on the relative distance D201 of another vehicle 201 belonging to the left row of vehicles 200 and information on the relative distance D301 of another vehicle 301 belonging to the right row of vehicles 300.

In the case where the information on the relative distances D201, D301, which is acquired by the acquisition section 21, is information indicating that the vehicles 201, 301 exist so close to the straddle-type vehicle 100 that each of the relative distances D201, D301 falls below a reference value, the analysis section 22 determines that the travel state of the straddle-type vehicle 100 is the travel between the rows of vehicles. In the case where the state where the vehicles 201, 301 exist so close to the straddle-type vehicle 100 on both of the left and right sides thereof that each of the relative distances D201, D301 falls below the reference value continues for a specified period or longer, or repeatedly occurs at specified time intervals or shorter for specified times or more, the analysis section 22 may determine that the travel state of the straddle-type vehicle 100 is the travel between the rows of vehicles. In addition, the analysis section 22 may keep determining that the travel state of the straddle-type vehicle 100 is the travel between the rows of vehicles until a state where the vehicles 201, 301 no longer exist so close to the straddle-type vehicle 100 on both of the left and right sides thereof that each of the relative distances D201, D301 falls below the reference value continues for a specified period or longer.

As an example, as illustrated in FIG. 4, in a situation where the straddle-type vehicle 100 travels in a group with other vehicles 110, 301a, 301b in a lane L1, the acquisition section 21 acquires the left target information and the right target information on the basis of the output of the surrounding environment detectors 11c, 11d. The left target information is the information on the target T1 that is located on the left side of the travel line DL of the straddle-type vehicle 100, and the right target information is the information on the targets T2 that are located on the right side of the travel line DL of the straddle-type vehicle 100. As the left target information, the information on the relative distance D201 of the vehicle 201, which travels on the left side of the straddle-type vehicle 100, to the straddle-type vehicle 100 is acquired. As the right target information, information on relative distances D301a, D301b of the vehicles 301a, 301b, each of which travels on the right side of the straddle-type vehicle 100, to the straddle-type vehicle 100 is acquired. As the information on the relative distances D201, D301a, D301b, the acquisition section 21 may acquire distances in the vehicle width direction of the straddle-type vehicle 100, may acquire distances at specified angles with respect to the vehicle width direction thereof, may acquire distances from the center of the straddle-type vehicle 100 in the vehicle width direction, may acquire distances from the lateral surfaces of the straddle-type vehicle 100, may acquire distances to the lateral surfaces of the vehicles 201, 301a, 301b, may acquire distances to the centers of the vehicles 201, 301a, 301b in vehicle width directions thereof, or may acquire other physical quantities that can substantially be converted to those. In the case where a travel row of the straddle-type vehicle 100 in the group travel is on a right side, as the left target information, information on relative distances of at least two vehicles, each of which travels on the left side of the straddle-type vehicle 100, to the straddle-type vehicle 100 only needs to be acquired.

In the case where the information on the relative distances D201, D301a, D301b, which is acquired by the acquisition section 21, is information indicating that the plural vehicles 301a, 301b, the relative distance of each of which to the straddle-type vehicle 100 falls below a reference value, exist on one side of the travel line DL of the straddle-type vehicle 100, the analysis section 22 determines that the travel state of the straddle-type vehicle 100 is the group travel. The reference value is preferably set to a smaller value than the relative distance D201. In addition, the analysis section 22 determines the travel row of the straddle-type vehicle 100 in the group travel by using information on which side of the travel line DL the plural vehicles 301a, 301b exist. In the case where a state where the plural vehicles 301a, 301b, the relative distance of each of which to the straddle-type vehicle 100 falls below the reference value, exist on the one side of the travel line DL of the straddle-type vehicle 100 continues for a specified period or longer, the analysis section 22 may determine that the travel state of the straddle-type vehicle 100 is the group travel. In addition, the analysis section 22 may keep determining that the travel state of the straddle-type vehicle 100 is the group travel until a state where the plural vehicles 301a, 301b, the relative distance of each of which to the straddle-type vehicle 100 falls below the reference value, no longer exist on the one side of the travel line DL of the straddle-type vehicle 100 continues for a specified period or longer.

As an example, as illustrated in FIG. 5, in a situation where the straddle-type vehicle 100 travels on one side in the lane L1, the acquisition section 21 acquires the left target information and the right target information on the basis of the output of the surrounding environment detectors 11c, 11d. The left target information is the information on the target T1 that is located on the left side of the travel line DL of the straddle-type vehicle 100, and the right target information is the information on the target T2 that is located on the right side of the travel line DL of the straddle-type vehicle 100. As the left target information, the information on the relative distance D201 of the vehicle 201, which travels on the left side of the straddle-type vehicle 100, to the straddle-type vehicle 100 is acquired. As the right target information, the information on the relative distance D301 of the vehicle 301, which travels on the right side of the straddle-type vehicle 100, to the straddle-type vehicle 100 is acquired. As the information on the relative distances D201, D301, the acquisition section 21 may acquire the distances in the vehicle width direction of the straddle-type vehicle 100, may acquire the distances at specified angles with respect to the vehicle width direction thereof, may acquire the distances from the center of the straddle-type vehicle 100 in the vehicle width direction, may acquire the distances from the lateral surfaces of the straddle-type vehicle 100, may acquire the distances to the lateral surfaces of the vehicles 201, 301, may acquire the distances to the centers of the vehicles 201, 301 in the vehicle width directions thereof, or may acquire other physical quantities that can substantially be converted to those. In the one-sided travel, the straddle-type vehicle 100 may travel at the different speed from the vehicle 201 or the vehicle 301 or may travel at the same speed. In the case where the straddle-type vehicle 100 makes travels on the one side at the different speed from the vehicle 201 and the vehicle 301, the acquisition section 21 acquires the information on the relative distances D201, D301 of the vehicles 201, 301 to the straddle-type vehicle 100 and thereafter acquires the information on the relative distance D201 of another vehicle 201 traveling in a left lane L2 and the information on the relative distance D301 of another vehicle 301 traveling in a right lane L3. Here, the target T1 may be a road facility (for example, a guardrail, a curbstone, a lane boundary line, or the like), and, as the left target information, information on the relative distance D201 of the straddle-type vehicle 100 to the road facility may be acquired. In addition, the target T2 may be the road facility (for example, the guardrail, the curbstone, the lane boundary line, or the like), and, as the right target information, information on the relative distance D301 of the straddle-type vehicle 100 to the road facility may be acquired.

The analysis section 22 analyzes a travel position of the straddle-type vehicle 100 in the lane L1 (that is, a travel position of the straddle-type vehicle 100 in the vehicle width direction) by using the information on the relative distances D201, D301 acquired by the acquisition section 21. In the case where a shift amount of the travel position from a center of the lane L1 exceeds a reference value, the analysis section 22 may determine that the travel state of the straddle-type vehicle 100 is the one-sided travel, may determine a shift direction, or may determine the shift amount. The analysis section 22 may time-average the information on the relative distances D201, D301, which is acquired by the acquisition section 21, so as to determine the travel position of the straddle-type vehicle 100 in the lane L1. In the case where the targets T1 or the targets T2 are the vehicles, the information on at least one of the relative distances D201, D301 may be acquired for the plural vehicles, and then an average value thereof may be calculated. In the case where the target T1 and the target T2 are a combination of objects, distances of which from lane boundaries tend to differ (for example, in the case where the target T1 is the vehicle 201 and the target T2 is the guardrail or the curbstone, or the like), the information on the relative distances D201, D301, which is acquired by the acquisition section 21, may be corrected by using a general statistical value of the distance from the lane boundary to each of the objects.

As an example, the execution section 23 executes, as the rider-assistance operation, cruise control operation or adaptive cruise control operation of the straddle-type vehicle 100. In the cruise control operation, a behavior controller 30 controls various mechanisms (for example, a brake, an engine, and the like) such that the straddle-type vehicle 100 travels at a target speed set by the rider. In the adaptive cruise control operation, in addition to such control, an inter-vehicular distance from a preceding vehicle is maintained. More specifically, in the adaptive cruise control operation, when the preceding vehicle is not present, the behavior controller 30 controls the various mechanisms (for example, the brake, the engine, and the like) such that the straddle-type vehicle 100 travels at the target speed set by the rider. When the preceding vehicle is present, the behavior controller 30 controls the various mechanisms (for example, the brake, the engine, and the like) such that the straddle-type vehicle 100 travels at a speed which is equal to or lower than the target speed and at which the inter-vehicular distance from the preceding vehicle is maintained. The execution section 23 outputs, to the behavior controller 30, a control command for causing the various mechanisms (for example, the brake, the engine, and the like) to execute the cruise control operation or the adaptive cruise control operation. In the adaptive cruise control operation, the execution section 23 acquires a travel state (for example, a relative distance, a relative speed, relative acceleration, or the like to the straddle-type vehicle 100) of the preceding vehicle on the basis of the output of the surrounding environment detector 11a and sets the target speed. The rider can adjust the inter-vehicular distance from the preceding vehicle.

In the case where the analysis section 22 determines that the travel state of the straddle-type vehicle 100 is the travel between the rows of vehicles (see FIG. 3) during the cruise control operation or the adaptive cruise control operation, the execution section 23 executes the rider-assistance operation corresponding to such a determination. For example, the execution section 23 forcibly cancels or interrupts the cruise control operation or the adaptive cruise control operation. Alternatively, for example, the execution section 23 forcible reduces the target speed in the cruise control operation or the adaptive cruise control operation by a specified amount or to a specified value. Further alternatively, for example, the execution section 23 forcibly switches the adaptive cruise control operation to the cruise control operation. Further alternatively, for example, in the adaptive cruise control operation, the execution section 23 forcibly narrows an area used to determine presence or absence of the preceding vehicle within a detection range of the surrounding environment detector 11a so as to exclude the vehicle 201, which travels ahead, in the left row of vehicles 200 and the vehicle 301, which travels ahead, in the right row of vehicles 300.

In the case where the analysis section 22 determines that the travel state of the straddle-type vehicle 100 is the group travel (see FIG. 4) during the cruise control operation or the adaptive cruise control operation, the execution section 23 executes the rider-assistance operation corresponding to such a determination. For example, in the adaptive cruise control operation, the execution section 23 forcibly widens the area used to determine the presence or the absence of the preceding vehicle within the detection range of the surrounding environment detector 11a so as to include the vehicle 301a, which travels in the group in a different travel row from the travel row, to which the straddle-type vehicle 100 belongs. At the time, the execution section 23 may only widen the area on a side where the vehicle 301a is present (the right side in the example of FIG. 4). In addition, the execution section 23 may narrow the area on a side where the vehicle 301a is absent (the left side in the example of FIG. 4). Furthermore, the execution section 23 forcibly reduces the inter-vehicular distance from the preceding vehicle (that is, the vehicle 301a), which is maintained in the adaptive cruise control operation, by a specified amount or to a specified value.

In the case where the analysis section 22 analyzes the travel position (see FIG. 5) of the straddle-type vehicle 100 during the cruise control operation or the adaptive cruise control operation, the execution section 23 executes the rider-assistance operation corresponding to the analysis result. For example, in the adaptive cruise control operation, the execution section 23 shifts the area used to determine the presence or the absence of the preceding vehicle within the detection range of the surrounding environment detector 11a in a manner to only include the lane L1, in which the straddle-type vehicle 100 travels. The execution section 23 may shift the area according to the shift direction and the shift amount of the travel position of the straddle-type vehicle 100 from the center of the lane L1. In addition, in the case where the shift amount is stabilized for a specified period or longer, the execution section 23 may shift the area. Furthermore, in the case where the shift amount does not exceed the reference value, the execution section 23 may not shift the area.

As an example, the execution section 23 executes, as the rider-assistance operation, frontal collision suppression operation for the straddle-type vehicle 100. When the frontal collision suppression operation is activated, a collision possibility with a target (for example, the vehicle, a person, an animal, an obstacle, a fallen object, or the like) that is located in front of the straddle-type vehicle 100 is determined. Then, when the collision possibility is higher than a reference, a warning device 40 issues a warning. The warning device 40 may issue the warning by sound, may issue the warning by display or lighting, may issue the warning by vibration, or may issue the warning by a combination of any of those. The warning device 40 may generate the vibration as the warning by controlling the various mechanisms (for example, the brake, the engine, and the like) to instantaneously decelerate or accelerate the straddle-type vehicle 100. In order for the straddle-type vehicle 100 to automatically avoid the collision, in the frontal collision suppression operation, the behavior controller 30 may control the various mechanisms (for example, the brake, the engine, and the like). The execution section 23 acquires information on the target located ahead (for example, a relative distance, a relative speed, relative acceleration, and the like to the straddle-type vehicle 100) on the basis of the output of the surrounding environment detector 11a, and determines the collision possibility. The warning device 40 may be provided to the straddle-type vehicle 100, may be provided to an accessory (for example, a helmet, a glove, or the like) associated with the straddle-type vehicle 100, may issue the warning to a driver of another vehicle, or may output a control command to a warning device in another vehicle or an accessory that is associated with another vehicle.

In the case where the analysis section 22 determines that the travel state of the straddle-type vehicle 100 is the travel between the rows of vehicles (see FIG. 3) in a situation where the frontal collision suppression operation is activated, the execution section 23 executes the rider-assistance operation corresponding to such a determination. For example, the execution section 23 forcibly narrows an area used to determine the collision possibility within the detection range of the surrounding environment detector 11a so as to exclude the vehicle 201, which travels ahead, in the left row of vehicles 200 and the vehicle 301, which travels ahead, in the right row of vehicles 300. In addition, for example, the execution section 23 forcibly prohibits the straddle-type vehicle 100 from being decelerated for the warning or avoidance. Furthermore, for example, the execution section 23 forcibly lowers an upper limit value of the deceleration that is generated on the straddle-type vehicle 100 for the warning or the avoidance.

In the case where the analysis section 22 determines that the travel state of the straddle-type vehicle 100 is the group travel (see FIG. 4) in the situation where the frontal collision suppression operation is activated, the execution section 23 executes the rider-assistance operation corresponding to such a determination. For example, the execution section 23 forcibly narrows the area used to determine the collision possibility within the detection range of the surrounding environment detector 11a so as to exclude the vehicle 301a that travels in the group in the different travel row from the travel row, to which the straddle-type vehicle 100 belongs. At the time, the execution section 23 may only narrow the area on a side where the vehicle 301a is present (the right side in the example of FIG. 4). In addition, for example, the execution section 23 forcibly prohibits the straddle-type vehicle 100 from being decelerated for the warning or the avoidance. Furthermore, for example, the execution section 23 forcibly lowers the upper limit value of the deceleration that is generated on the straddle-type vehicle 100 for the warning or the avoidance.

In the case where the analysis section 22 analyzes the travel position (see FIG. 5) of the straddle-type vehicle 100 in the situation where the frontal collision suppression operation is activated, the execution section 23 executes the rider-assistance operation corresponding to the analysis result. For example, the execution section 23 shifts the area used to determine the collision possibility within the detection range of the surrounding environment detector 11a so as to only include the lane L1, in which the straddle-type vehicle 100 travels. The execution section 23 may shift the area according to the shift direction and the shift amount of the travel position of the straddle-type vehicle 100 from the center of the lane L1. In addition, in the case where the shift amount is stabilized for the specified period or longer, the execution section 23 may shift the area. Furthermore, in the case where the shift amount does not exceed the reference value, the execution section 23 may not shift the area.

The rider-assistance operation, which is changed by the execution section 23 according to the determination result by the analysis section 22, may be the collision suppression operation for the target (for example, the vehicle, the fallen object, or the like) that is located behind or on the side of the straddle-type vehicle 100. Also, in such collision suppression operation, the execution section 23 may be operated in a similar manner to that in the frontal collision suppression operation.

As an example, the execution section 23 executes, as the rider-assistance operation, blind spot travel vehicle warning operation for the straddle-type vehicle 100. When the blind spot travel vehicle warning operation is activated, presence or absence of a vehicle that is located diagonally behind the straddle-type vehicle 100 is determined. In the case where such a vehicle is present, the warning device 40 issues the warning. The warning device 40 may issue the warning by sound, may issue the warning by the display or lighting, may issue the warning by the vibration, or may issue the warning by the combination of any of those. The warning device 40 may generate the vibration as the warning by controlling the various mechanisms (for example, the brake, the engine, and the like) to instantaneously decelerate or accelerate the straddle-type vehicle 100. The execution section 23 determines the presence or the absence of the vehicle that is located diagonally behind the straddle-type vehicle 100 on the basis of the output of the surrounding environment detector 11b. Instead of the surrounding environment detector 11b, based on the output of the surrounding environment detectors 11c, 11d, the presence or the absence of the vehicle that is located diagonally behind the straddle-type vehicle 100 may be determined.

In the case where the analysis section 22 determines that the travel state of the straddle-type vehicle 100 is the travel between the rows of vehicles (see FIG. 3) in a situation where the blind spot travel vehicle warning operation is activated, the execution section 23 executes the rider-assistance operation corresponding to such a determination. For example, the execution section 23 forcibly prohibits issuance of the warning. In addition, for example, the execution section 23 forcibly degrades the rider's perception of the warning.

In the case where the analysis section 22 determines that the travel state of the straddle-type vehicle 100 is the group travel (see FIG. 4) in the situation where the blind spot travel vehicle warning operation is activated, the execution section 23 executes the rider-assistance operation corresponding to such a determination. For example, the execution section 23 forcibly prohibits the issuance of the warning. In addition, for example, the execution section 23 forcibly degrades the rider's perception of the warning.

In the case where the analysis section 22 analyzes the travel position (see FIG. 5) of the straddle-type vehicle 100 in the situation where the blind spot travel vehicle warning operation is activated, the execution section 23 executes the rider-assistance operation corresponding to the analysis result. For example, the execution section 23 shifts an area that is used to determine the presence or the absence of the vehicle within a detection range of the surrounding environment detector 11b to an opposite side of the center of the lane L1 in the shift direction from the travel position of the straddle-type vehicle 100. At the time, the execution section 23 may determine an amount to be shifted according to the shift amount. In addition, in the case where the shift amount is stabilized for the specified period or longer, the execution section 23 may shift the area. Furthermore, in the case where the shift amount does not exceed the reference value, the execution section 23 may not shift the area.

<Operation of Rider-Assistance System>

A description will be made on operation of the rider-assistance system according to the embodiment.

FIG. 6 is a chart illustrating an operation flow of the controller in the rider-assistance system according to the embodiment of the present invention. An order of steps may appropriately be switched, or a different step may appropriately be added.

The controller 20 repeatedly executes the operation flow illustrated in FIG. 6 during the travel of the straddle-type vehicle 100.

(Acquisition Step)

In step S101, the acquisition section 21 acquires the information on the target that is located around the straddle-type vehicle 100 on the basis of the output of the surrounding environment detectors 11a, 11b, 11c, 11d. In particular, the acquisition section 21 acquires the left target information and the right target information. The left target information is the information on the target T1 that is located on the left side of the travel line DL of the straddle-type vehicle 100, and the right target information is the information on the target T2 that is located on the right side of the travel line DL.

(Analysis Step)

Next, in step S102, the analysis section 22 analyzes the travel state of the straddle-type vehicle 100 on the basis of at least one of the left target information and the right target information.

(Execution Step)

Next, in step S103, the execution section 23 executes the rider-assistance operation that corresponds to the analysis result of the travel state by the analysis section 22.

<Effects of Rider-Assistance System>

A description will be made on effects of the rider-assistance system according to the embodiment.

In the rider-assistance system 1, the left target information, which is the information on the target T1 located on the left side of the travel line DL of the straddle-type vehicle 100, and the right target information, which is the information on the target T2 located on the right side of the travel line DL, are acquired on the basis of the output of the at least one surrounding environment detector (for example, the surrounding environment detectors 11c, 11d). The travel state of the straddle-type vehicle 100 is analyzed on the basis of at least one of the left target information and the right target information. The rider-assistance operation that corresponds to the analysis result is executed. Thus, it is possible to appropriately handle the special travel made by the straddle-type vehicle 100.

Preferably, the left target information is the information on the relative distance of the at least one vehicle (201 in the examples illustrated in FIG. 3 to FIG. 5), which is located on the left side of the travel line DL, to the straddle-type vehicle 100, and the right target information is the information on the relative distance of the at least one vehicle (301, 301*a*, 301*b* in the examples illustrated in FIG. 3 to FIG. 5), which is located on the right side of the travel line DL, to the straddle-type vehicle 100. With such a configuration, the special travel made by the straddle-type vehicle 100 is further appropriately handled. In particular, the information on the relative distance is preferably information on the relative distance (D201, D301, D301*a*, D301*b* in the examples illustrated in FIG. 3 to FIG. 5) in the vehicle width direction of the straddle-type vehicle 100. With such a configuration, the special travel made by the straddle-type vehicle 100 is further reliably handled.

Preferably, the left target information is acquired on the basis of the output of the surrounding environment detector 11*c* that has the detection range Rc, and the right target information is acquired on the basis of the output of the surrounding environment detector 1*d* that has the detection range Rd. That is, the left target information and the right target information are acquired by the different detectors. With such a configuration, inclusion of an unnecessary area in the detection range is suppressed, which reduces a calculation processing load, improves accuracy of the information, and the like, for example. In particular, preferably, the surrounding environment detector 11*c* is oriented to just the left side of the straddle-type vehicle 100, and the surrounding environment detector 11*d* is oriented to just the right side of the straddle-type vehicle 100. With such a configuration, the accurate information is acquired.

Preferably, the analysis section 22 analyzes the presence or the absence of the travel of the straddle-type vehicle 100 between the rows of vehicles on the basis of the left target information and the right target information that are acquired by the acquisition section 21. With such a configuration, it is possible to execute the rider-assistance operation, which corresponds to the travel state unique to the straddle-type vehicle 100, that is, the travel between the rows of vehicles that can be made due to significantly small size of the straddle-type vehicle 100.

Preferably, the analysis section 22 analyzes the presence or the absence of the group travel of the straddle-type vehicle 100 on the basis of at least one of the left target information and the right target information that are acquired by the acquisition section 21. With such a configuration, it is possible to execute the rider-assistance operation, which corresponds to the travel state unique to the straddle-type vehicle 100, that is, the high-density group travel that can be made due to the significantly small size of the straddle-type vehicle 100. In particular, preferably, the analysis section 22 analyzes the travel row of the straddle-type vehicle 100 in the group travel on the basis of at least one of the left target information and the right target information that are acquired by the acquisition section 21. With such a configuration, it is possible to execute the rider-assistance operation, which corresponds to the travel state unique to the straddle-type vehicle 100, that is, the staggered group travel that can be made due to the significantly small size of the straddle-type vehicle 100.

Preferably, the analysis section 22 analyzes the travel position of the straddle-type vehicle 100 in the lane L1 on the basis of the left target information and the right target information that are acquired by the acquisition section 21. With such a configuration, it is possible to execute the rider-assistance operation, which corresponds to the travel state unique to the straddle-type vehicle 100, that is, the travel at the position that is significantly shifted from the center of the lane L1 and can be made due to the significantly small size of the straddle-type vehicle 100. In particular, the analysis section 22 analyzes the shift direction and the shift amount of the travel position from the center of the lane L1 on the basis of the left target information and the right target information that are acquired by the acquisition section 21. With such a configuration, it is possible to reliably handle the travel at the position that is significantly shifted from the center of the lane L1.

Preferably, the execution section 23 changes the cruise control operation or the adaptive cruise control operation of the straddle-type vehicle 100 according to the analysis result of the travel state by the analysis section 22. In addition, the execution section 23 changes the collision suppression operation of the straddle-type vehicle 100 according to the analysis result of the travel state by the analysis section 22. Furthermore, the execution section 23 changes the blind spot travel vehicle warning operation of the straddle-type vehicle 100 according to the analysis result of the travel state by the analysis section 22. In those types of the operations, necessity of using the appropriate information is especially high. That is, it is particularly useful in those types of the operations to analyze the travel state of the straddle-type vehicle 100 on the basis of the left target information and the right target information.

The embodiment of the present invention is not limited to that in the above description. That is, the present invention includes modes in each of which the embodiment that has been described so far is modified. In addition, the present invention includes a mode in which the embodiment that has been described so far is only partially implemented or a mode in which the modes are combined.

REFERENCE SIGNS LIST

1: Rider-assistance system
11*a*, 11*b*, 11*c*, 11*d*: Surrounding environment detector
12: Travel state detector
20: Controller
21: Acquisition section
22: Analysis section
23: Execution section
30: Behavior controller
40: Warning device
100: Straddle-type vehicle
200, 300: Row of vehicles
110, 201, 301, 301*a*, 301*b*: Vehicle
T1, T2: Target
DL: Travel line
L1, L2, L3: Lane
Rc, Rd: Detection range

What is claimed is:

1. A controller (20) for a straddle-type vehicle (100), to which at least one surrounding environment detector (11*c*, 11*d*) is mounted, the controller (20) comprising:
   an execution section (23) that executes rider-assistance operation to assist with a rider of the straddle-type vehicle (100),
   an acquisition section (21) that acquires left target information and right target information on the basis of output of the surrounding environment detector (11*c*, 11*d*), the left target information being information on a target (T1) that is located on a left side of a travel line (DL) of the straddle-type vehicle (100) and the right target information being information on a target (T2) that is located on a right side of the travel line (DL); and
   an analysis section (22) that determines a travel state of the straddle-type vehicle (100) on the basis of at least one of the left target information and the right target information that are acquired by the acquisition section (21), wherein
the rider-assistance operation includes at least a cruise control operation or an adaptive cruise control operation for the straddle-type vehicle (100),
the execution section (23) executes the rider-assistance operation, which includes the cruise control operation or the adaptive cruise control operation, that corresponds to an analysis result of the travel state by the analysis section (22),
the analysis section (22) determines, as the travel state, a presence or absence of travel of the straddle-type vehicle (100) between rows of vehicles on the basis of the left target information and the right target information that are acquired by the acquisition section (21),
the execution section (23) changes the cruise control operation or the adaptive cruise control operation according to an analysis result of presence or absence of the travel of the straddle-type vehicle (100) between the rows of vehicles by the analysis section (22),
the left target information is information on a relative distance of at least one vehicle (201) that is located on the left side of the travel line (DL) to the straddle-type vehicle (100),
the right target information is information on a relative distance of at least one vehicle (301, 301a, 301b) that is located on the right side of the travel line (DL) to the straddle-type vehicle (100), and
the determining, as the travel state, the presence of travel of the straddle-type vehicle (100) between rows of vehicles includes determining that each of the relative distance of at least one vehicle (201) that is located on the left side of the travel line (DL) and the relative distance of at least one vehicle (301, 301a, 301b) that is located on the right side of the travel line (DL) fall below a reference value.

2. The controller (20) according to claim 1, wherein the information on the relative distance is information on a relative distance (D201, D301, D301a, D301b) in a vehicle width direction of the straddle-type vehicle (100).

3. The controller (20) according to claim 1, wherein the left target information is acquired on the basis of output of a first surrounding environment detector (11c) that is the surrounding environment detector having a first detection range (Rc), and
the right target information is acquired on the basis of output of a second surrounding environment detector (11d) that is the surrounding environment detector having a second detection range (Rd) differing from the first detection range (Rc).

4. The controller (20) according to claim 3, wherein the first surrounding environment detector (11c) is oriented to just a left side of the straddle-type vehicle (100), and
the second surrounding environment detector (11d) is oriented to just a right side of the straddle-type vehicle (100).

5. The controller (20) according to claim 1, wherein the analysis section (22) analyzes, as the travel state, presence or absence of group travel of the straddle-type vehicle (100) on the basis of at least one of the left target information and the right target information that are acquired by the acquisition section (21), and
the execution section (23) executes the rider-assistance operation that corresponds to an analysis result of presence or absence of the group travel of the straddle-type vehicle (100) by the analysis section (22).

6. The controller (20) according to claim 1, wherein the analysis section (22) analyzes, as the travel state, a travel row of the straddle-type vehicle (100) in group travel on the basis of at least one of the left target information and the right target information that are acquired by the acquisition section (21), and
the execution section (23) executes the rider-assistance operation that corresponds to an analysis result of the travel row by the analysis section (22).

7. The controller (20) according to claim 1, wherein the analysis section (22) analyzes, as the travel state, a travel position of the straddle-type vehicle (100) in a lane (L1) on the basis of the left target information and the right target information that are acquired by the acquisition section (21), and
the execution section (23) executes the rider-assistance operation that corresponds to an analysis result of the travel position by the analysis section (22).

8. The controller (20) according to claim 7, wherein the analysis section (22) analyzes, as the travel state, a shift direction and a shift amount of the travel position from a center of the lane (L1) on the basis of the left target information and the right target information that are acquired by the acquisition section (21), and
the execution section (23) executes the rider-assistance operation that corresponds to an analysis result of the shift direction and the shift amount by the analysis section (22).

9. The controller (20) according to claim 1, wherein the execution section (23) changes collision suppression operation for the straddle-type vehicle (100), which is executed as the rider-assistance operation, according to the analysis result of the travel state by the analysis section (22).

10. The controller (20) according to claim 1, wherein the execution section (23) changes blind spot travel vehicle warning operation for the straddle-type vehicle (100), which is executed as the rider-assistance operation, according to the analysis result of the travel state by the analysis section (22).

11. A rider-assistance system (1) comprising:
the controller (20) according to claim 1.

12. A control method for a straddle-type vehicle (100), to which at least one surrounding environment detector (11c, 11d) is mounted, the control method comprising:
an execution step (S103) in which an execution section (23) of a controller (20) executes rider-assistance operation to assist with a rider of the straddle-type vehicle (100),
an acquisition step (S101) in which an acquisition section (21) of the controller (20) acquires left target information and right target information on the basis of output of the surrounding environment detector (11c, 11d), the left target information being information on a target (T1) that is located on a left side of a travel line (DL) of the straddle-type vehicle (100) and the right target information being information on a target (T2) that is located on a right side of the travel line (DL); and
an analysis step (S102) in which an analysis section (22) of the controller (20) determines a travel state of the straddle-type vehicle (100) on the basis of at least one of the left target information and the right target information that are acquired in the acquisition step (S101), wherein the rider-assistance operation includes at least a cruise control operation or an adaptive cruise control operation for the straddle-type vehicle (100), in the execution step (S103), the execution section (23) executes the rider-assistance operation, which includes the cruise control operation or the adaptive cruise control operation, that corresponds to an analysis result of the travel state in the analysis step (S102), in the analysis step (S102), the analysis section (22) determines, as the travel state, a presence or absence of travel of the straddle-type vehicle (100) between rows of vehicles on the basis of the left target information and the right target information that are acquired by the acquisition section (21), in the execution step (S103), the execution section (23) changes the cruise control operation or the adaptive cruise control operation according to an analysis result of presence or absence of the travel of the straddle-type vehicle (100) between the rows of vehicles by the analysis section (22), the left target information is information on a relative distance of at least one vehicle (201) that is located on the left side of the travel line (DL) to the straddle-type vehicle (100), the right target information is information on a relative distance of at least one vehicle (301, 301a, 301b) that is located on the right side of the travel line (DL) to the straddle-type vehicle (100), and the determining, as the travel state, the presence of travel of the straddle-type vehicle (100) between rows of vehicles includes determining that each of the relative distance of at least one vehicle (201) that is located on the left side of the travel line (DL) and the relative distance of at least one vehicle (301, 301a, 301b) that is located on the right side of the travel line (DL) fall below a reference value.

13. The control method according to claim 12, wherein in a group travel for the travel state, when a blind spot travel vehicle warning operation is activated, the execution section (23) prohibits issuance of a blind spot travel vehicle warning.

14. The controller according to claim 6, wherein in a group travel for the travel state, when a blind spot travel vehicle warning operation is activated, the execution section (23) prohibits issuance of a blind spot travel vehicle warning.

15. A controller (20) for a straddle-type vehicle (100), to which at least one surrounding environment detector (11c, 11d) is mounted, the controller (20) comprising:

an execution section (23) that executes rider-assistance operation to assist with a rider of the straddle-type vehicle (100), an acquisition section (21) that acquires left target information and right target information on the basis of output of the surrounding environment detector (11c, 11d), the left target information being information on a target (T1) that is located on a left side of a travel line (DL) of the straddle-type vehicle (100) and the right target information being information on a target (T2) that is located on a right side of the travel line (DL); and an analysis section (22) that determines a travel state of the straddle-type vehicle (100) on the basis of at least one of the left target information and the right target information that are acquired by the acquisition section (21), wherein the rider-assistance operation includes at least a cruise control operation or an adaptive cruise control operation for the straddle-type vehicle (100), the execution section (23) executes the rider-assistance operation, which includes the cruise control operation or the adaptive cruise control operation, that corresponds to an analysis result of the travel state by the analysis section (22), the analysis section (22) determines, as the travel state, a presence or absence of travel of the straddle-type vehicle (100) between rows of vehicles on the basis of the left target information and the right target information that are acquired by the acquisition section (21), the execution section (23) changes the cruise control operation or the adaptive cruise control operation according to an analysis result of presence or absence of the travel of the straddle-type vehicle (100) between the rows of vehicles by the analysis section (22), the left target information is information on a relative distance of at least one vehicle (201) that is located on the left side of the travel line (DL) to the straddle-type vehicle (100), the right target information is information on a relative distance of at least one vehicle (301, 301a, 301b) that is located on the right side of the travel line (DL) to the straddle-type vehicle (100), the determining, as the travel state, the presence of travel of the straddle-type vehicle (100) between rows of vehicles includes determining that each of the relative distance of at least one vehicle (201) that is located on the left side of the travel line (DL) and the relative distance of at least one vehicle (301, 301a, 301b) that is located on the right side of the travel line (DL) fall below a reference value, and wherein in a group travel for the travel state, when a blind spot travel vehicle warning operation is activated, the execution section (23) prohibits issuance of a blind spot travel vehicle warning.

* * * * *